United States Patent [19]

Kanai et al.

[11] Patent Number: 5,513,898
[45] Date of Patent: May 7, 1996

[54] CHAIR WITH REMOVABLE ARMREST

[75] Inventors: Hiroshi Kanai; Hideo Nishimura; Atsuo Okamoto; Mitsunobu Choda, all of Kamakura, Japan

[73] Assignee: Uchida Yoko Co., Ltd., Tokyo, Japan

[21] Appl. No.: 231,160

[22] Filed: Apr. 22, 1994

[30] Foreign Application Priority Data

May 12, 1993 [JP] Japan .................................. 5-024565 U

[51] Int. Cl.⁶ ..................................................... A47C 7/54
[52] U.S. Cl. .................................... 297/411.27; 297/411.2
[58] Field of Search ............................ 297/411.2, 411.23, 297/411.24, 411.26, 411.27, 440.1, 411.44, 411.28; 248/118, 222.4, 223.1, 223.2; 403/345

[56] References Cited

U.S. PATENT DOCUMENTS

| | | | |
|---|---|---|---|
| 2,030,635 | 2/1936 | Horwitt et al. | 297/411.27 X |
| 2,815,067 | 12/1957 | Richardson | 297/411.27 X |
| 3,986,318 | 10/1976 | McConnell | 248/222.4 X |
| 4,054,317 | 10/1977 | Stumpf | 297/411.26 X |
| 4,159,148 | 6/1979 | Schulz | 297/411.27 X |
| 4,707,026 | 11/1987 | Johansson | 297/411.27 X |
| 4,913,393 | 4/1990 | Wood | 297/411.23 X |

FOREIGN PATENT DOCUMENTS

| | | |
|---|---|---|
| 136796 | 4/1985 | European Pat. Off. . |
| 585515 | 3/1994 | European Pat. Off. . |

*Primary Examiner*—Milton Nelson, Jr.
*Attorney, Agent, or Firm*—Beveridge, DeGrandi, Weilacher & Young

[57] ABSTRACT

Mounts are provided on the inside surface of the left and the right sides of a seat cover on the underside of a chair, and positioning pins with heads and fastening members are provided on the upper surfaces of the bases of armrests. Each mount includes keyholed-shaped positioning holes respectively having holes for insertion of the heads of the positioning pins and slits of a width suitable for slidably receiving the rods of the positioning pins. Each mount also includes a support hole for the fastening member to be engaged in. When the positioning pins are located at the rear ends of the slits of the positioning holes, the armrest is fixed to the mount through the support hole by the fastening member. Thus the armrests are removably assembled with the chair body. The seat cover has upper and lower protrusions which contact the mount and the base of the armrest, respectively. The mount is bent so that its outboard and inboard portions are inclined relative to each other.

8 Claims, 9 Drawing Sheets

CHAIR WITH REMOVABLE ARMREST

BACKGROUND OF THE INVENTION

The present invention relates to an office chair, specifically a chair with armrests which are removable from the chair body.

Figure 14:
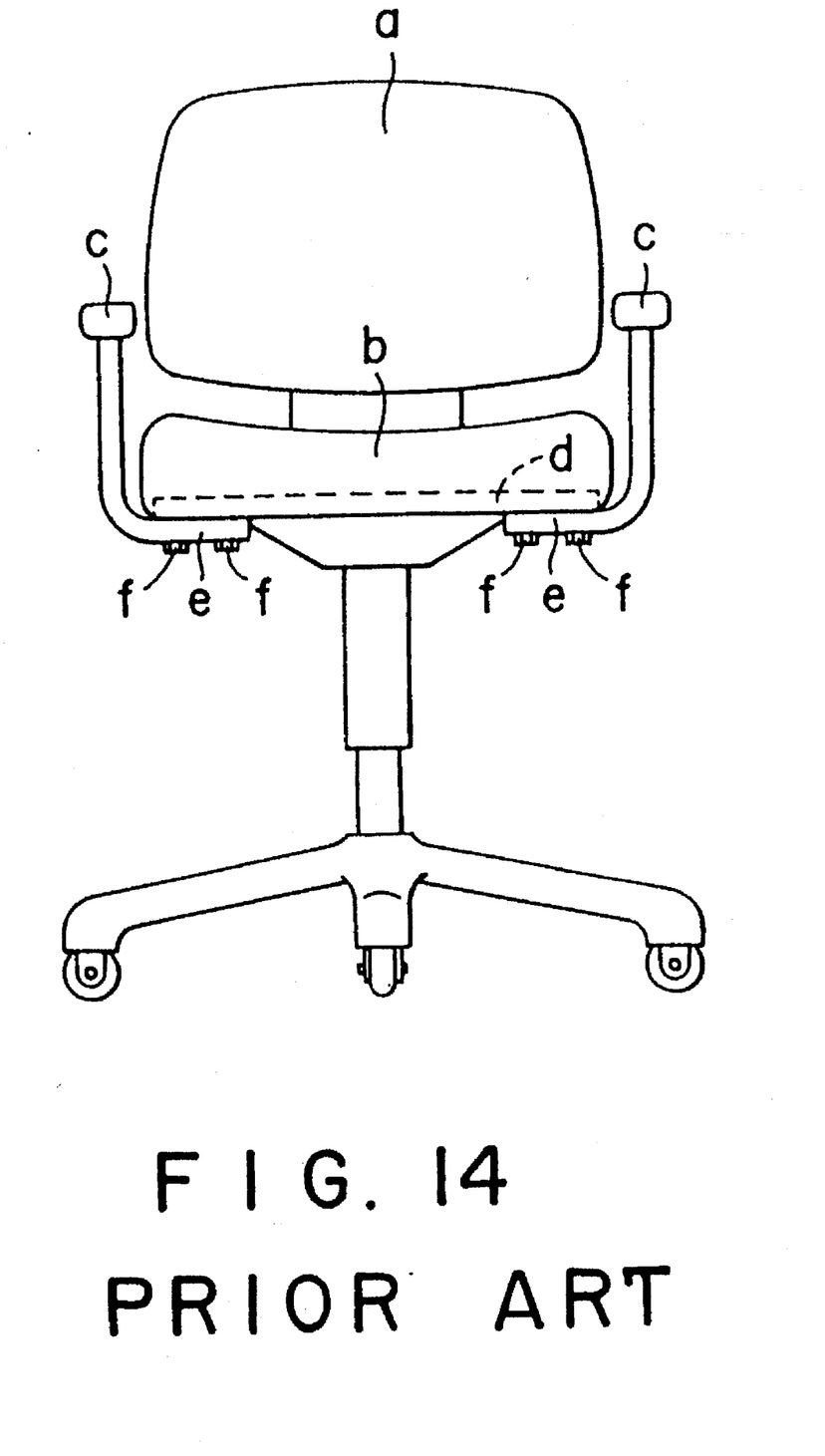
FIG. 14 is a front view of a conventional chair.

As shown in FIG. 14, a conventional chair a used in offices, etc. has armrests c, c on both ends of a seat b (see, e.g., Japanese Patent Laid-Open Publication No. 60813/1985).

The armrests c, c of the chair of this type each have the bases e, e thereof secured to a base plate d fixed to the underside of the seat b by means of bolts f, f. The chair with armrests is manufactured as one chair, and is handled as a whole chair throughout in a process from storage before shipment to distribution.

SUMMARY OF THE INVENTION

But to meet various demands, in the above-described conventional structure, chairs with armrests c, c of various kinds of designs and colors have to be manufactured and distributed. To this end, a large number of types of chairs has to be stocked, which makes their manufacture and stocking difficult, and resultantly their manufacturing costs go up.

The present invention was made in view of this problem. An object of the present invention is to provide a chair which can be distributed in the form of a body of the chair with armrests removed therefrom, the chair body of which can be furnished with armrests of a design and a color in accordance with a demand to be supplied, and which permits the armrests to be attached to the body by one touch.

According to the present invention, a chair has a seat, a seat cover on the underside of the seat, and armrests. Positioning pins are mounted on the bases of the armrests, and each of the positioning pins has a head which is located above its respective base and a rod which extends down from the head. Left and right mounts are provided on the inside surface of the seat cover. Each mount includes a hole for insertion of the head of a positioning pin, a slit which is in communication with and narrower than the head for slidingly receiving the rod of the positioning pin, and a support hole for receiving a fastening member. Fastening members extend from the bases into the support holes to secure the armrests to the mounts. Each of the mounts has an inboard portion and an outboard portion which is inclined upwardly and outwardly relative to the inboard portion. The seat cover has a lower protrusion and an upper protrusion. The lower protrusion contacts the base of an armrest, and the upper protrusion contacts the mount.

In the chair of such structure according to the present invention, when attaching armrests to the seat cover on the underside of the seat, the heads of the positioning pins of the bases of the armrests are inserted into the holes of the keyhole-shaped positioning holes in the mounts from below the seat cover, and then the rods of the positioning pins are slid into the slits.

The mounts each include holes for insertion of the heads of the positioning pins and slits extending from the holes and having a width in which the rods of the positioning pins closely fit and a support hole for receiving the associated fastening member. The armrests are secured to the mounts by fastening members put through the support holes when the positioning pins are located at the rear ends of the slits of the positioning holes, the fastening members are fastened and engaged in the holes of the mounts, and the armrests are attached stationary to the mounts. When the armrests are removed from the mounts, the fastening members are undone, and the positioning pins are slid to the holes in the positioning holes and removed in a downward direction.

DETAILED DESCRIPTION OF THE PREFERRED EMBODIMENTS

The chair of the present invention will be explained by means of one embodiment of the present invention shown in the drawings.

Figure 1:
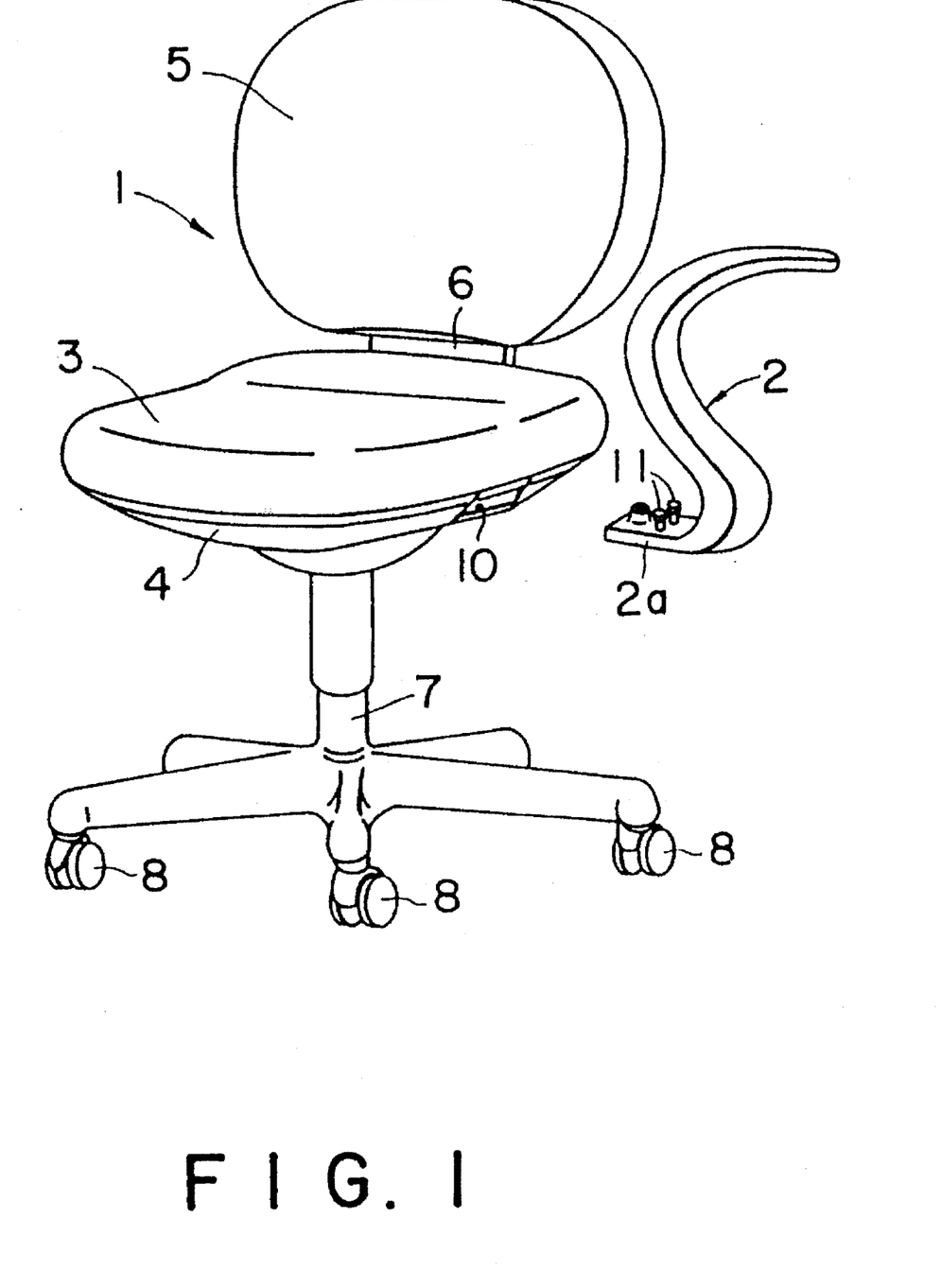
FIG. 1 is a perspective of the chair according to the present invention with one armrest removed from the body of the chair.

FIG. 1 is a perspective view of a chair 1 according to the present invention with armrests 2 removed therefrom. The armrests 2 are positioned by positioning pins 11 at respective bases 2a thereof on the left and the right sides of a seat cover 4 which is on the underside of a seat 3 of the chair 1. The armrests 2a are removably secured to mounts 10, 10, Reference numeral 5 represents a back which is supported by a frame 6 of the chair 2 on the back 5 of the seat 3, Reference numeral 7 indicates a leg, and 8 denotes casters provided on the leg 7.

Figure 2:
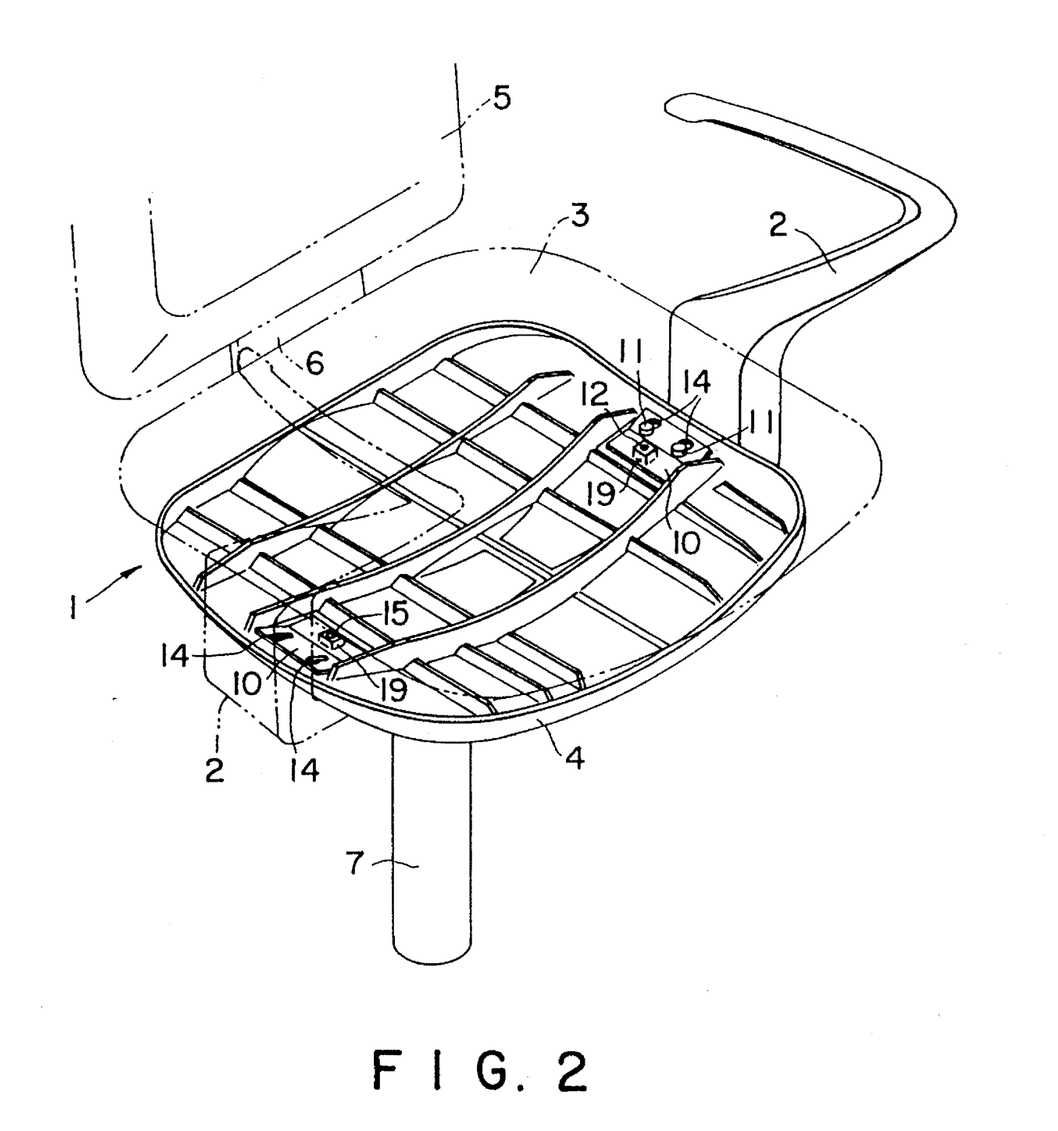
FIG. 2 is a broken-down perspective view of the chair of FIG. 1 with the seat removed.
Figure 3:
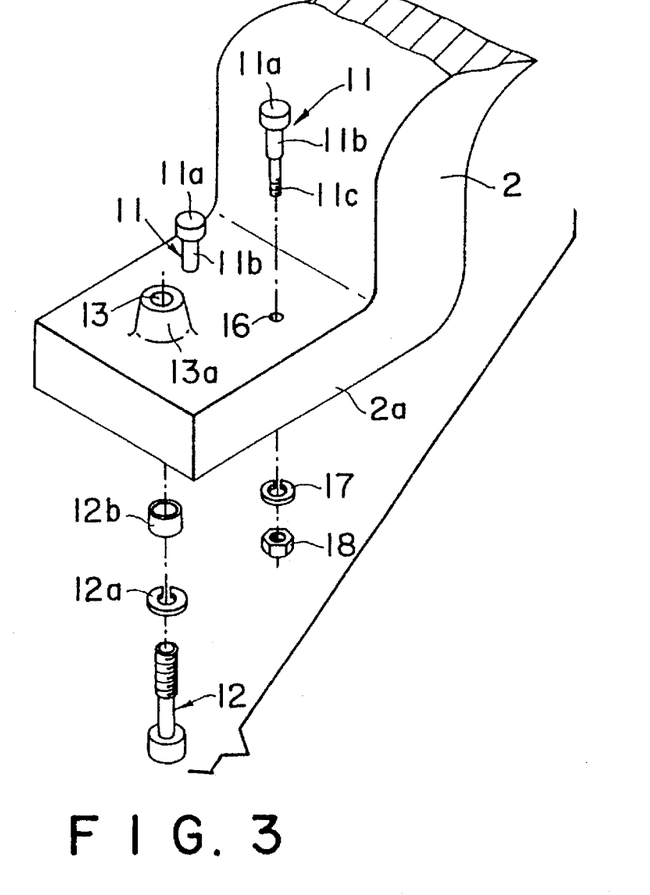
FIG. 3 is an enlarged view of the base of the armrest in FIG, 1, and the positioning holes in FIG, 1.

FIG. 2 is a broken view of the chair 1 with the seat 3 removed therefrom. The seat cover 4 is a molded member of plastics. The mounts are metal plates 10, 10 secured to the inside surfaces of the left and the right sides of the seat covers by welds or other means. As shown in FIG. 3, in the upper surface of the base 2a of each armrest 2 there are formed holes 16 for a pair of left and right positioning pins 11 with circular heads 11a, and a hole 13 for a fastening member 12. The hole 13 is formed in a boss 13a in a forward part of the base 2a.

Figure 4:
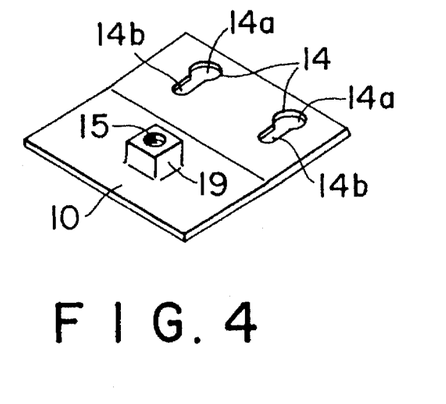
FIG. 4 is an enlarged broken-down perspective view of one example of the mount of the armrests in FIG. 1.

As detailed in FIG. 4, each mount 10 has left and right positioning holes 14, 14 formed in an outer part thereof, spaced from each other by the same distance as the positioning pins 11, 11, and one support hole 15 formed in a nut 19 provided in an inner part thereof. Each positioning hole is keyhole shaped and it includes a hole 14a having a size which allows the head 11a of one of the positioning pins 11 to pass through, and a slit 14b which extends from the hole 14a toward the support hole 15. The slit 146 has a width which allows a rod 11b of the positioning pin 11 to fit closely therein.

As shown in FIG. 3, the positioning pins 11 are inserted in the holes 16 from above the upper surfaces of the bases 2a of the armrests 2, washers 17 are put on threaded portions 11c of the pins 11 from below, and nuts 18 are screwed on. And the positioning pins 11 are put in the bases 2a of the armrests 2.

As exemplified in FIG. 3, the fastening member 12 can be a bolt. The fastening member 12 is inserted into the hole 13 of the base 2a of the armrest 2 from below the base 2a of the armrest 2 through a washer 12a and a collar 12b and is screwed onto the threaded portion of the nut 19 provided on the mount. And the fastening member 12 is retained on the base 2a. The fastening member 12 and the support hole 15 in the mount 10 are arranged so as to be brought into alignment with each other when the positioning pins 11, 11 are located at the rearmost part in the slits 14b, 14b of the positioning holes 14, 14.

Figure 5:
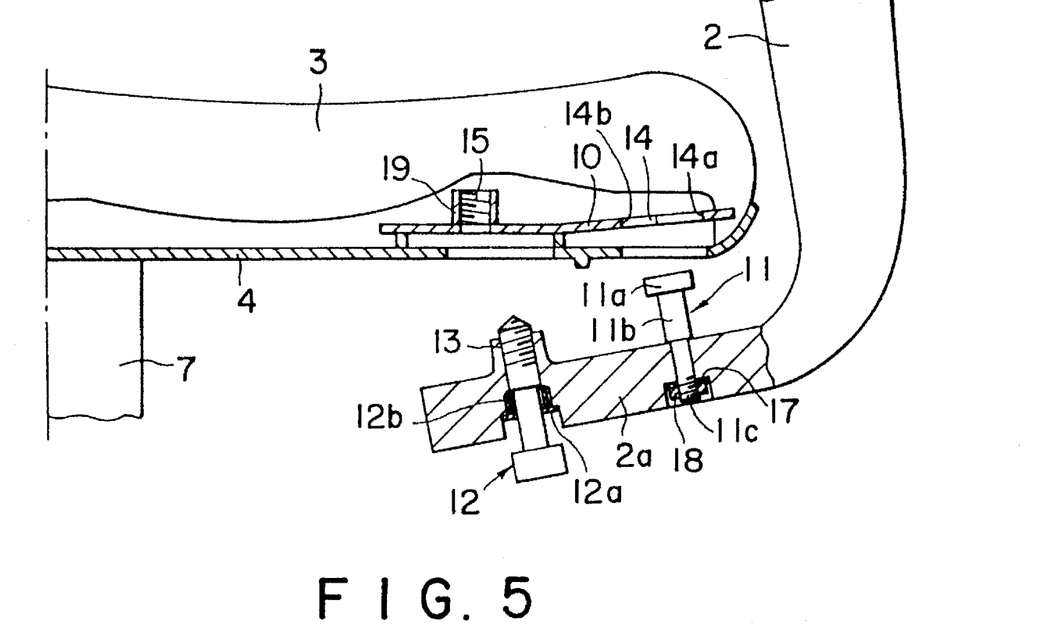
FIG. 5 is a partial vertical sectional view of the mount of the chair and the armrest in FIG, 1 before the latter is attached to the other.
Figure 6:
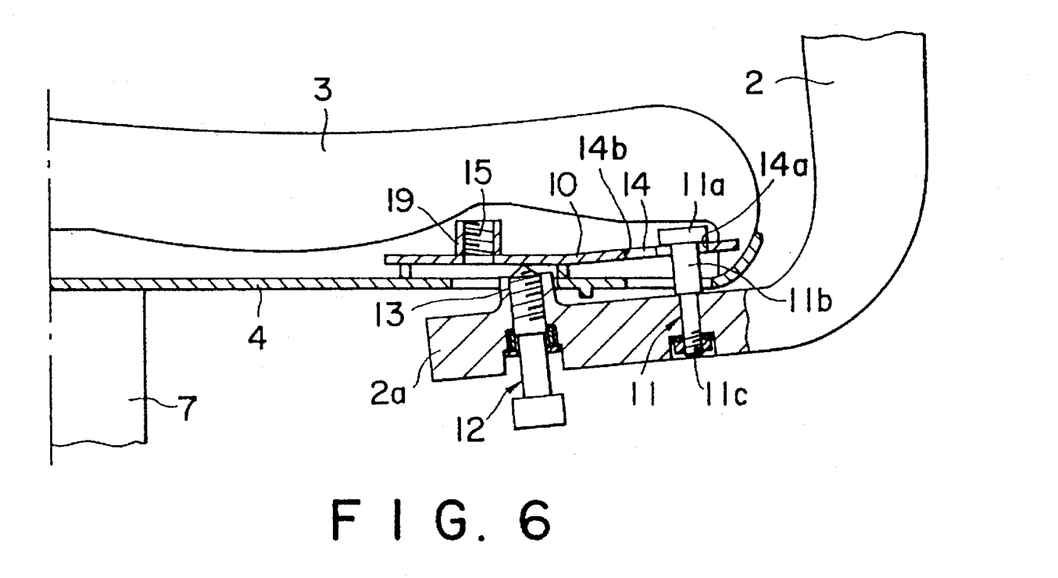
FIG. 6 is a partial vertical sectional view of the mount with the positioning pins inserted therein.

Thus to mount the armrest 2 on the seat cover 4 of the seat 3, as shown in FIG. 5, the heads 11a, 11a of the positioning pins 11, 11 are passed through the holes 14a, 14a of the keyhole shaped positioning holes 14, 14 in the mount 10 (FIG. 6), then, in FIG. 6, as the armrest 2 is slid left, the rods 11b, 11b of the positioning pins 11, 11 slide into the slit 14b, 14b. When the rods 11b, 11b arrive at the rear end of the slits 14b, 14b, the fastening member 12 and the support hole 15 in the mount 10 are in register (FIG. 7).

Figure 7:
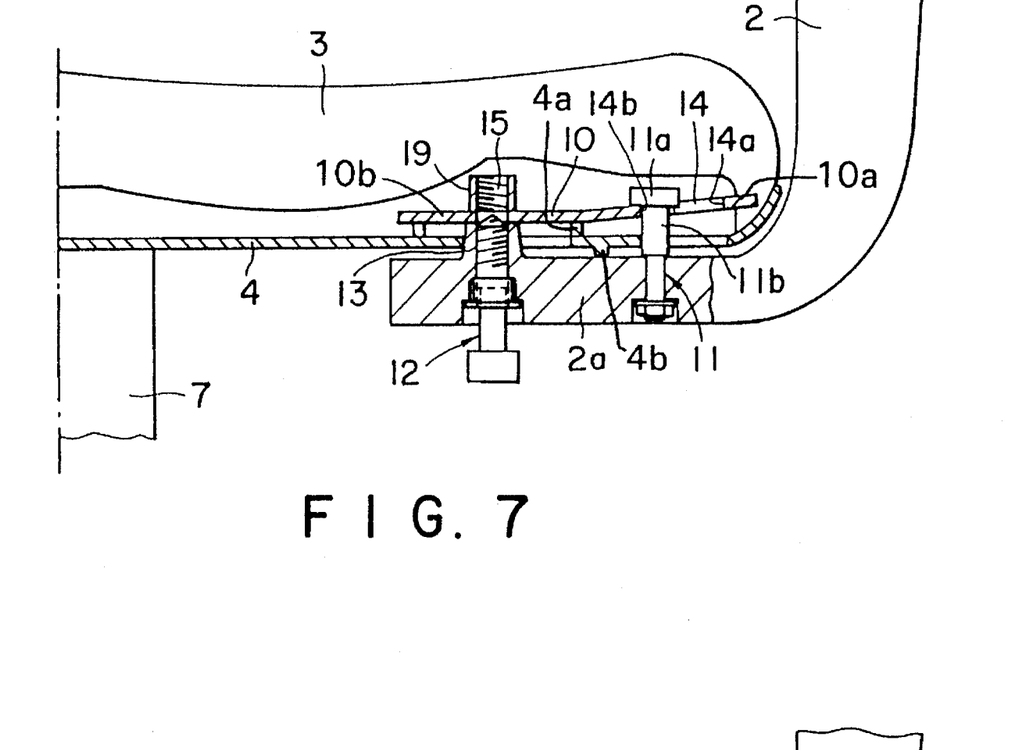
FIG. 7 is a partial vertical sectional view of the state in which the positioning pins are inserted in the mount and then slid into position and the fastening member is not still fastened.

As shown in FIG. 7, the seat cover 4 has two protrusions. The upwardly directed protrusion 4a provides vertical spacing between the mount 10 and the body of the seat cover 4; and, the downwardly directed protrusion provides vertical spacing between the base 2a of the armrest and the body of the seat cover 4.

Also in FIG. 7, it will be seen that the mount 10 is slightly bent so that its outboard portion 10a is inclined upwardly and outwardly relative to the substantially horizontal inboard portion 10b.

Figure 8:
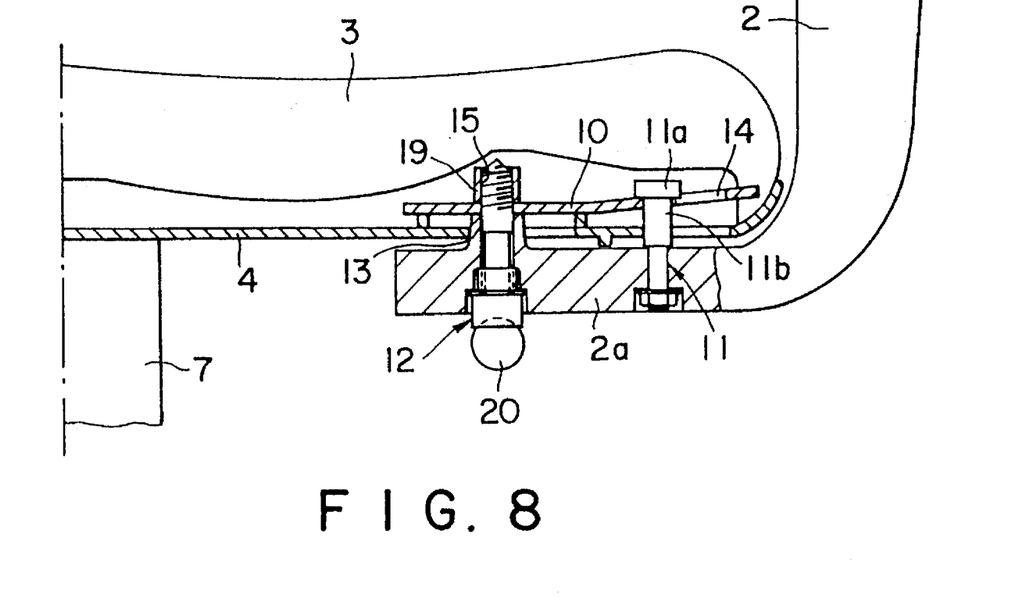
FIG. 8 is a partial vertical view of the state in which the fastening member is fastened.

As shown in FIG. 8, the fastening member 12 is turned by inserting, e.g., a coin 20 into a groove formed in the head thereof to be screwed into the threaded portion of the support hole 15 of the nut 19, and the mount 10 is brought nearer to the base 2a and fixed. When the armrest 2 is removed from the body of the chair as required, the fastening member 12 is unfastened and pulled out downward, and then the armrest 2 is slid outward to displace the positioning pins 11, 11 to the larger holes 14a of the positioning holes 14, 14, and the positioning pins 11, 11 are pulled out downward.

FIGS. 9 to 13 show examples of modifications of the fastening member 12.

Figure 9:
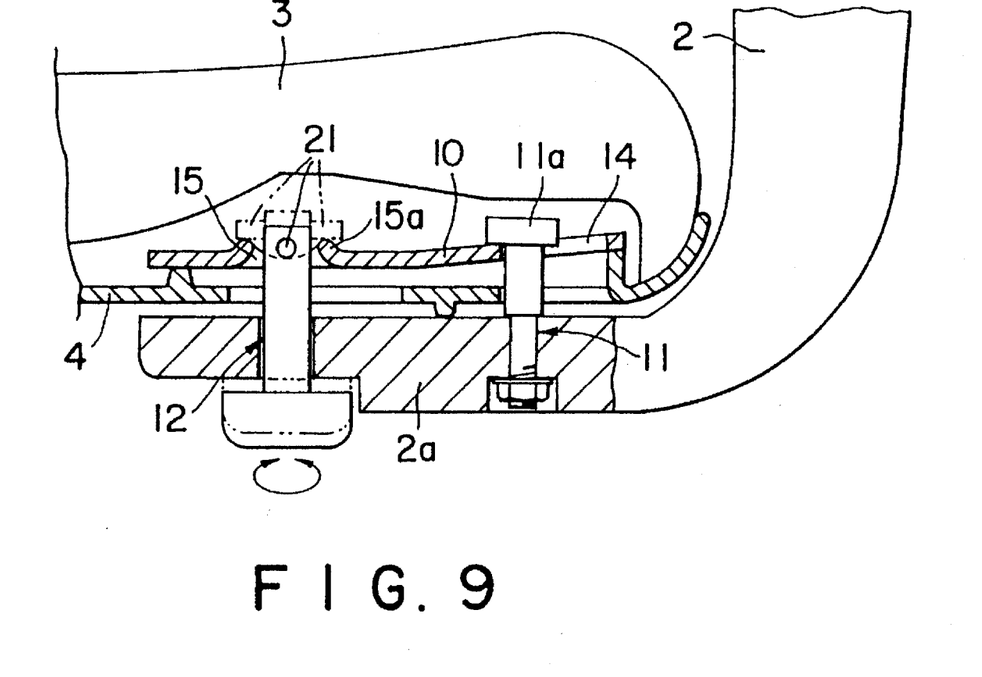
FIG. 9 is a partial sectional view of a modification of the fastening member in use.

In the example of FIG. 9, in place of the screw-engagement, a pin 21 is diametrically put through an upper portion of the fastening member 12, while a radially horizontal hole for the pin 21 to be passed through is formed in the support hole 15 in the mount 10. The pin 21 is put through the horizontal hole, and then the fastening member 12 is turned by 90°. And the pin 21 is driven onto the upper surface of the edge 15a of the support hole 15. In this example, each positioning hole 14 has a hole 14a and a slit 14b as in FIG. 7.

Figure 10:
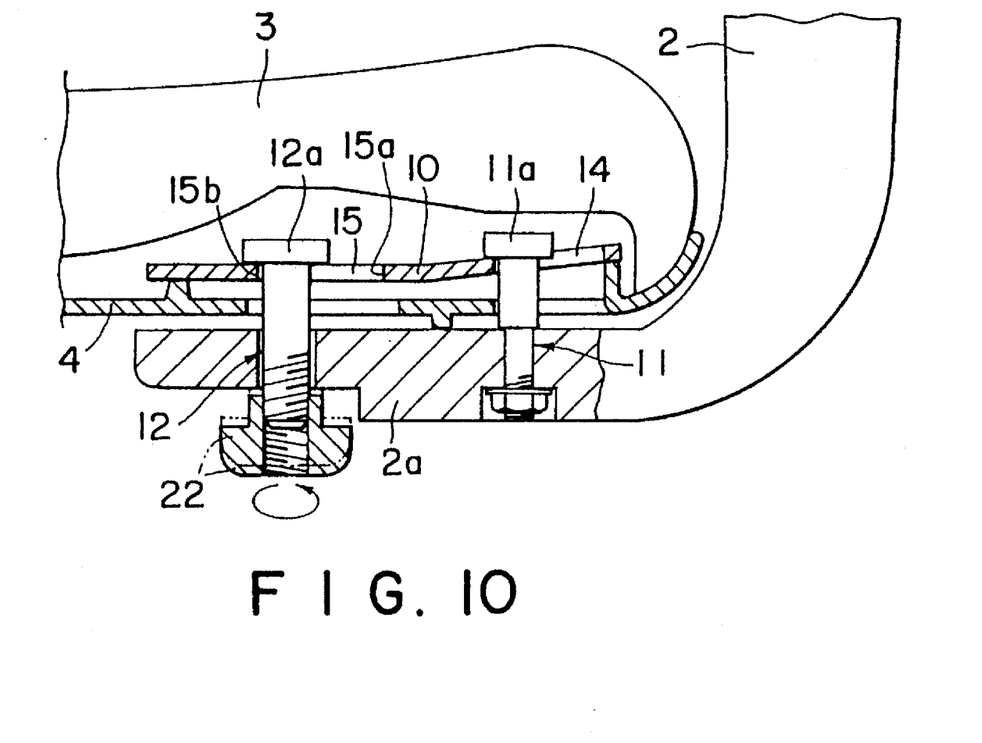
FIG. 10 is a partial sectional view of a modification of the fastening member in use.

In the example of FIG. 10, the fastening member 12 has a head 12a as the positioning pins 11 have. The support hole 15 is keyhole-shaped and it includes a hole 15a and a slit 15b. The fastening member 12 with the nut 22 loosened is put in the slit 15b of the support hole 15, and then the nut 22 is tightened to fix the fastening member 12.

Figure 11:
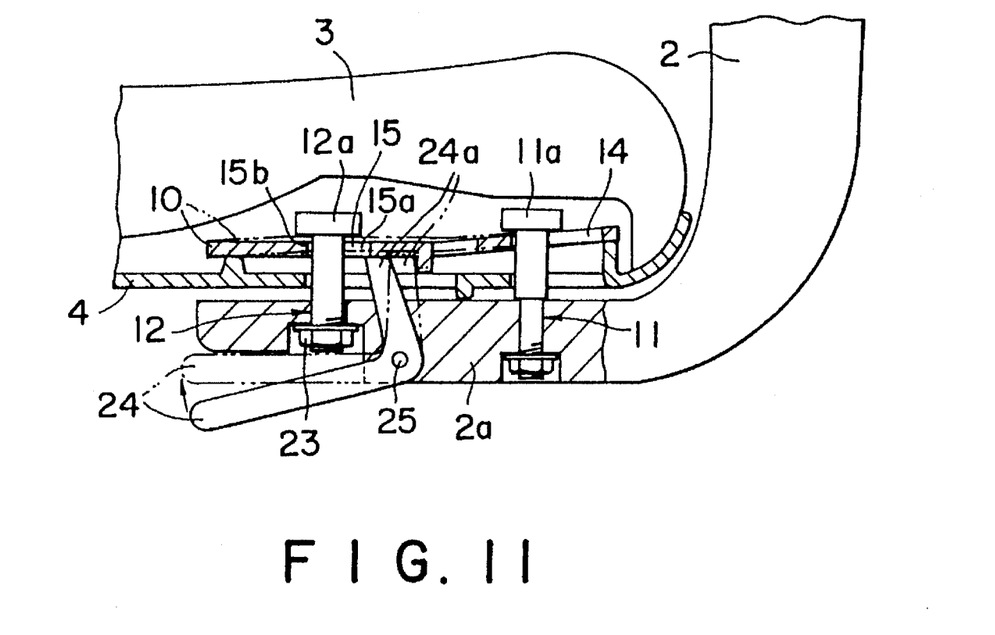
FIG. 11 is a partial sectional view of a modification of the fastening member in use.

In the example of FIG. 11, the nut 22 used in the example of FIG. 10 is replaced by a coming-off preventive member 23 which is fixed to the fastening member 12. A substantially L-shaped lever 24 has the middle portion pivotally connected to the base 2a by a pin 25 with the upward end 24a being in contact with the underside of the mount 10. The lever 24 is turned clock-wise as indicated by the chain line in FIG. 11, and the underside of the mount 10 bears on the forward end 24a of the lever 24, whereby the mount 10 and the base 21 are resiliently fixed to each other.

Figure 12:
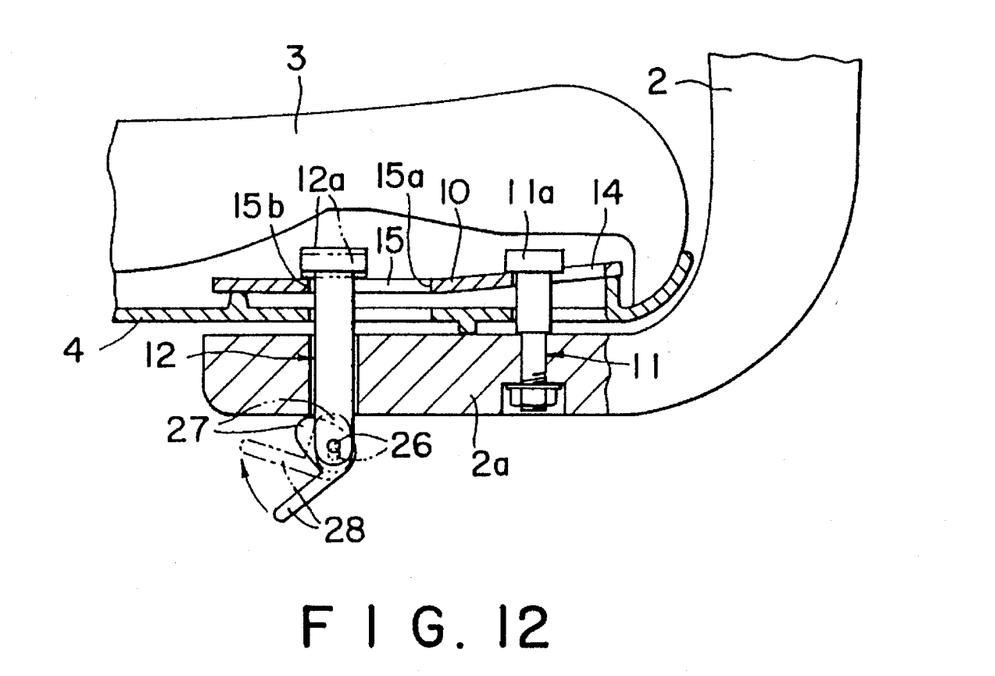
FIG. 12 is a partial vertical sectional view of a modification of the fastening member in use.

In the example of FIG. 12, the lever in the example of FIG. 11 is replaced by a cam 27 pivotally connected to the lower end of the fastening member 12. The cam 27 is turned in the direction of the arrow by a lever 28 secured to the cam 27 to pull the fastening member 12, whereby the mount 10 and the base 2a are resiliently fixed to each other.

Figure 13:
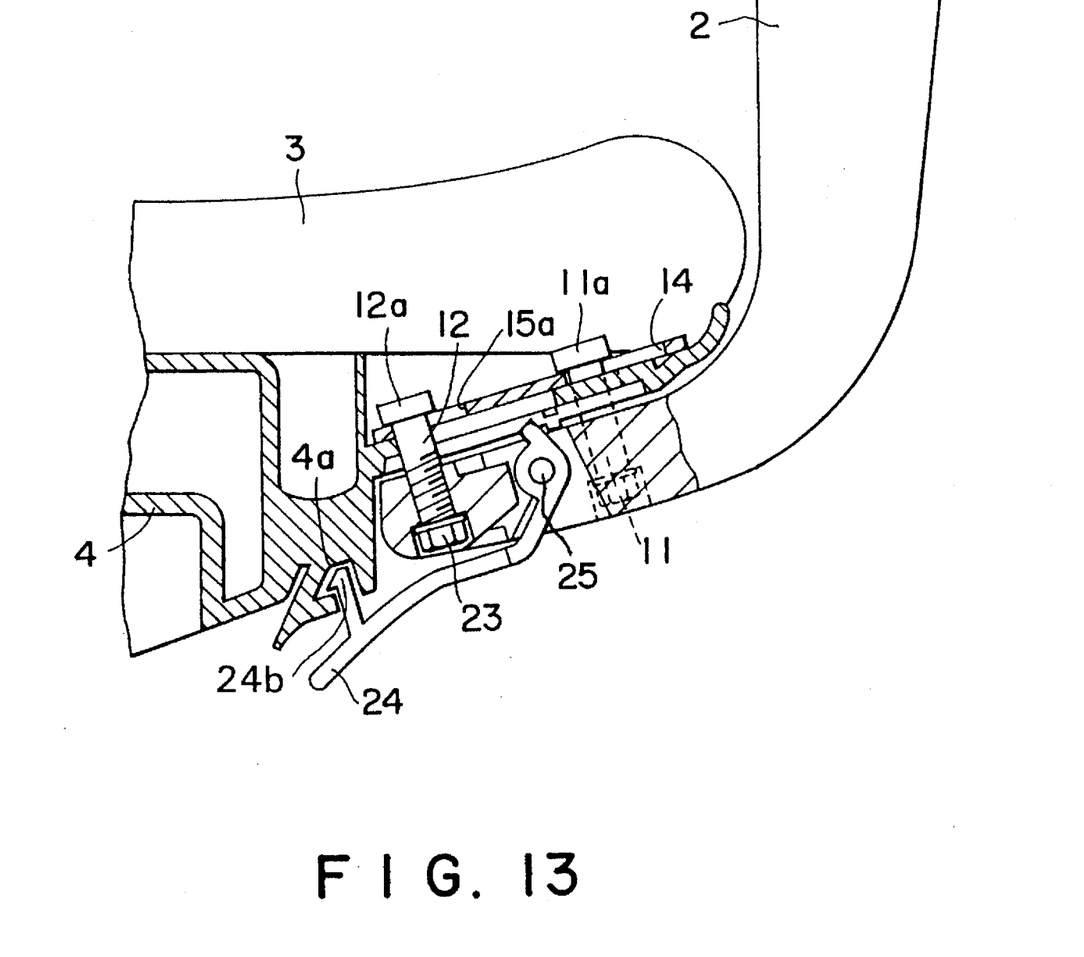
FIG. 13 is a partial vertical sectional view of a modification of the fastening member in use.

The example of FIG. 13 is a further modification of the lever 24 used in the example of FIG. 11. A hook 24b is projected from the lever 24 from a part near the forward end. The lever 24 is turned to bring the hook 24b into resilient engagement with a recess 4a formed in the seat cover 4, whereby the armrest 2 is secured to the seat cover 4.

In the shown embodiments, the left the right mounts 10, 10 are separated from each other. But it is possible that the mounts may be in the form of one sheet of plate which traverses the seat cover 4, and the positioning holes 14, 14, and the support hole 15 are formed in the plate. The armrests 2 can be in required shapes.

As described above, the chair according to the present invention can be provided in one chair comprising a body of the chair including the seat and back which is commonly used, and various kinds of armrests attached to the body as required. Accordingly only samples of the chair are on display. As a result, the manufacture, stocking, etc. are easy, and stocking space savings and cost savings can be achieved.

The armrests can be attached without looseness only by inserting the positioning pins of the bases of the armrests into the positioning holes in the mounts sliding the positioning pins, and fastening the fastening members. The armrest can be attached without the use of tools.

What is claimed is:

1. A chair, comprising, a seat having a seat cover on its underside, said seat cover having an inside surface;

armrests having bases;

positioning pins which are mounted on the bases of said armrests, each of said positioning pins having a head which is located above its respective said base and a rod which extends down from said head;

left and right mounts provided on the inside surface of said seat cover, each of said mounts including a hole for insertion of the head of a positioning pin, a slit which is in communication with and narrower than said head for slidingly receiving the rod of the positioning pin, and a support hole for receiving a fastening member;

fastening members extending from said bases into said support holes to secure said armrests to said mounts;

each of said mounts having an inboard portion and an outboard portion which is inclined upwardly and outwardly relative to said inboard portion;

said seat cover having a lower protrusion and an upper protrusion, said lower protrusion of the seat cover contacting the base of a said armrest, said upper protrusion of the seat cover contacting a said mount.

2. The chair according to claim 1, wherein said mounts are a pair of left and right metal plates, and a threaded portion is formed in each support hole, said support hole being formed in a nut formed on the upper surface of each metal plate.

3. The chair according to claim 1, wherein said mounts are formed in one sheet of plate.

4. The chair according to claim 1, wherein said fastening members are bolts each having a threaded portion to be screw-engaged with the associated support hole.

5. The chair according to claim 1, wherein said fastening members are rod members each having a diametrically extended pin inserted through the upper end thereof, said support hole having an edge which has an upper surface, said pin being engaged against a said upper surface of an associated support hole.

6. The chair according to claim 1, wherein said fastening members are members each having a head on the upper end and a nut screw-engaged with a lower part.

7. The chair according to claim 1, wherein said fastening members are members each having a head on the upper end and a coming-off preventive member fixed to a lower part, L-shaped levers are adjacently provided, each lever is so turned that the forward end of the lever pushes up the associated mounts on the underside.

8. The chair according to claim 1, wherein said fastening members each include a rod with a head, and a cam pivotally connected to the lower end of the rod by a pin.

* * * * *